March 30, 1937. W. E. WILSON 2,075,491
DENTAL X-RAY FILM HOLDER
Filed Oct. 19, 1933 3 Sheets-Sheet 1
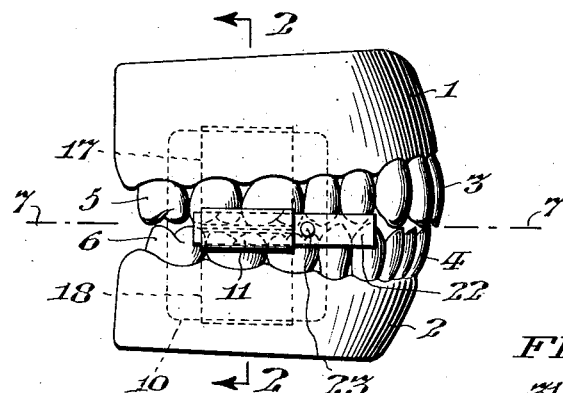
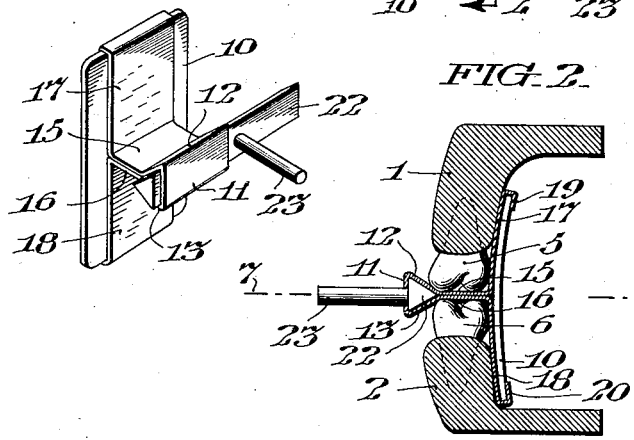
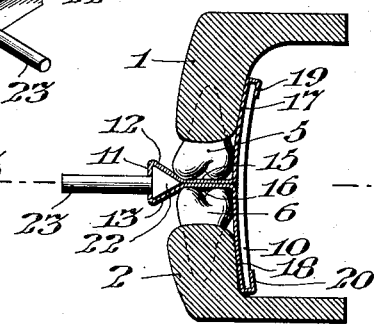
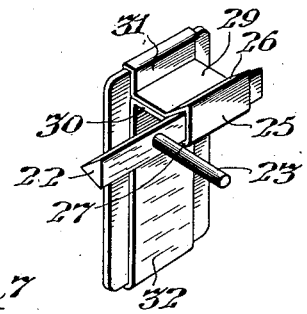
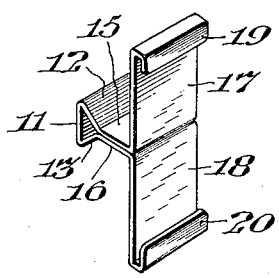
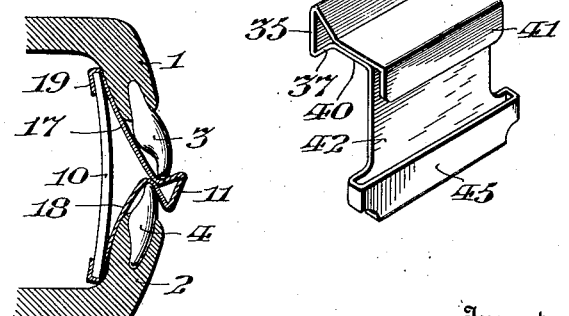
Inventor
William Everett Wilson,
By Clifton E. Hallowell
Attorney

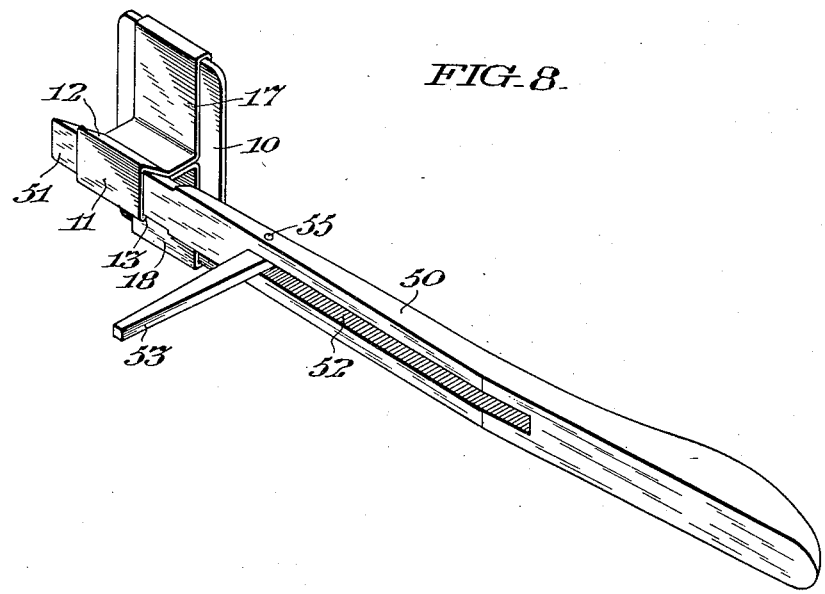
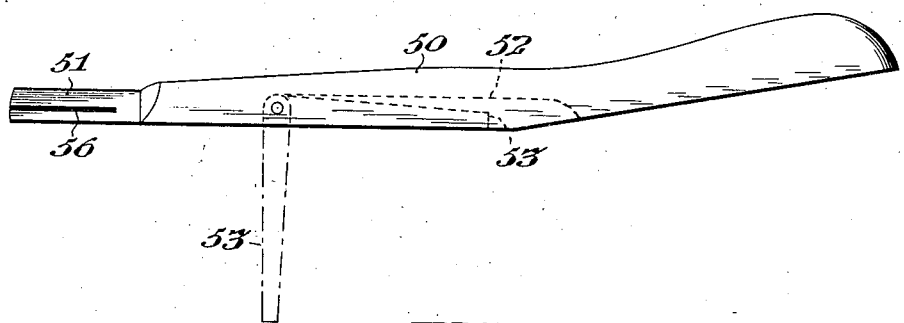
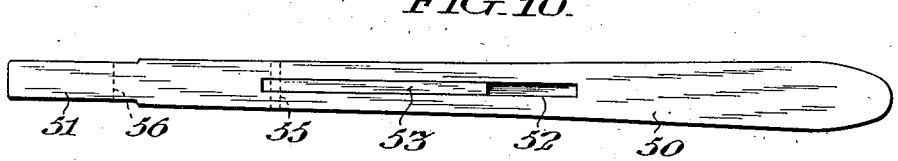
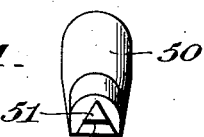

March 30, 1937. W. E. WILSON 2,075,491
DENTAL X-RAY FILM HOLDER
Filed Oct. 19, 1933 3 Sheets-Sheet 3
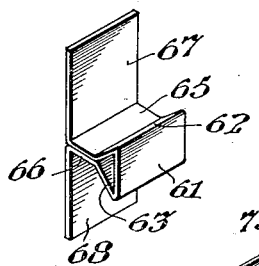
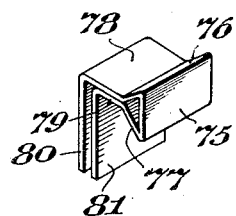
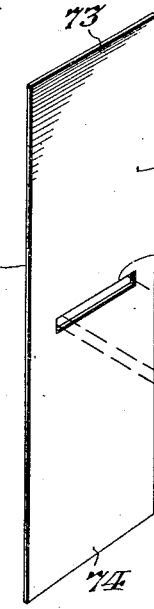
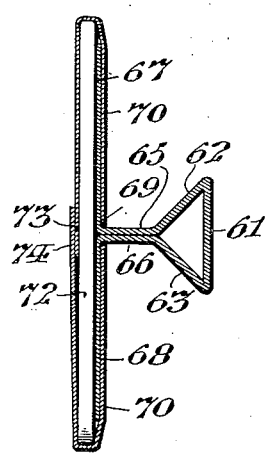
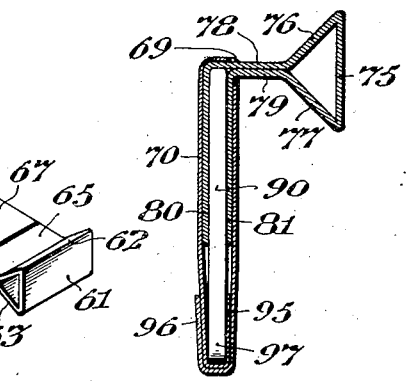
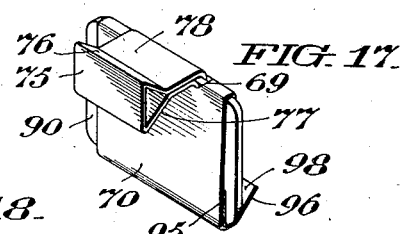
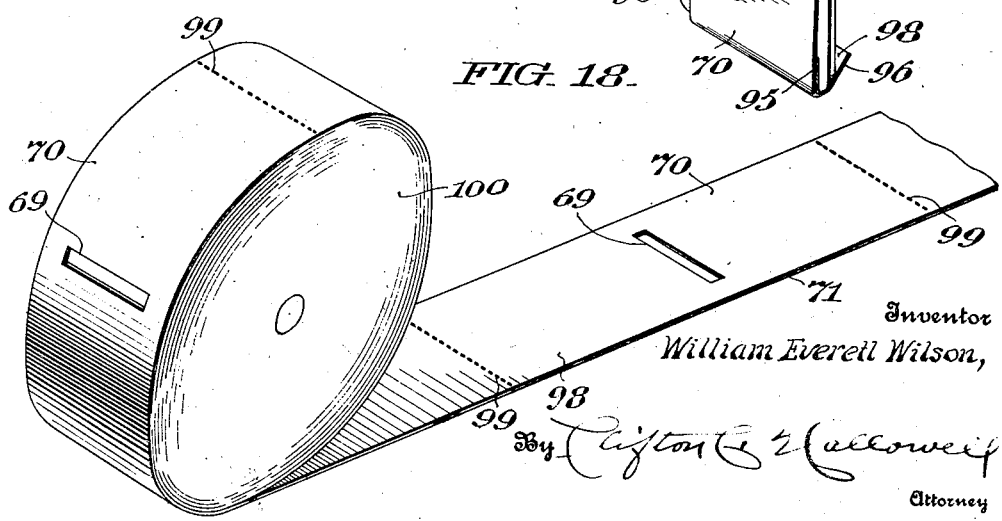
Inventor
William Everett Wilson,
By Clifton E. Galloway
Attorney Patented Mar. 30, 1937

2,075,491

UNITED STATES PATENT OFFICE 2,075,491

DENTAL X-RAY FILM HOLDER

William Everett Wilson, Pasadena, Calif.

Application October 19, 1933, Serial No. 694,269

15 Claims. (Cl. 250—34)

My invention relates particularly to holders for films adapted to be employed in taking radiographs of teeth of the dental arches, and is especially directed to that type of film-holders which have means arranged to be engaged between the antagonized cusps or incisal edges of the teeth of the upper and lower dental arches.

It has been common practice in the taking of radiographs of teeth of the dental arches, for either the patient or operator to hold the film against the inner side of the tooth or teeth to be radiographed, by thumb or finger pressure tending to maintain the film as closely as possible to the lingual surfaces of the teeth in order to insure that the resultant picture or image be as accurate and clear-cut as may be possible.

The principal objects of my invention are to provide a dental X-ray film-holder that is simple in construction, inexpensive to manufacture, easy to adjust and hold in position, highly efficient in its operation, and that will not interfere with the light rays effective to produce the desired image.

Other objects of my invention are to provide a film-holder with a bite piece having relatively inclined surfaces with which the teeth of the upper and lower dental arches may engage so as to draw the film bodily into close contact with the lingual surfaces of the teeth and adjacent tissues and firmly maintain it thus engaged.

Further objects of my invention are to provide a film-holder with means visible to the operator by which the position of the film within the patient's mouth may be so determined as to indicate the proper positioning of the X-ray tube whereby its axis will be substantially normal to the plane of the sensitive film and the shadow cast will produce an accurate image of the teeth and the surrounding or adjacent tissue area upon said film.

My invention includes an X-ray film-holder formed of thin sheet material that is light in weight, automatic in its cooperation with the teeth to insure its proper positioning, and that may be conveniently provided with removable reinforcing means formed of a substance that will not interfere with the passage of the X-ray, and having a ray directing medium not only indicating the proper axial direction for the axis of the X-ray tube and its directed ray, but also serving to hold the corner of the patient's mouth back for the convenience of the operator's observation.

My invention further includes a simplified form of X-ray film-holder and its method of application, which includes a perforated strip of gummed web of paper, cloth or other suitable material in the form of adhesive tape, readily applied, and by which it may be firmly secured to the film.

My invention comprehends a combination of an X-ray film-holder of the type contemplated, with a handle to which it may be readily applied in removable relation and by which it may be positioned in the patient's mouth, and the proper direction and position of the axis of the X-ray tube determined by an adjustable disappearing pointer on said handle.

My invention also includes all of the various novel features of construction and arrangement as hereinafter more definitely specified.

In the accompanying drawings, Figure 1 is a side elevational view of a denture model representing the full upper and lower sets in substantial occlusion but sufficiently spaced apart to include the X-ray film-holder between their occlusal surfaces, said film-holder and the position indicating device being also shown in side elevation and holding the film, shown in dotted lines, in position to take the image of at least two upper and two lower molar teeth at the right side of the set; Fig. 2 is a transverse vertical sectional view taken through the right side of the set of teeth and film holder shown in Fig. 1, on the line 2—2 in said figure, the film and the indicating device being shown in elevation for convenience of illustration; Fig. 3 is an exterior perspective view of the assembled film, film-holder, and film position indicating device as shown in Figs. 1 and 2; Fig. 4 is an interior perspective view of the film-holder, shown in Fig. 3, per se; Fig. 5 is an exterior perspective view of an assembled film, film-holder, and film position indicating device, the film holder being of a form permitting the major portion of the film to extend to a greater depth from the plane of occlusion than the film shown in Fig. 3 wherein the film is equally divided and extends above and below said plane of occlusion equally; Fig. 6 is an interior perspective view of a modified form of film-holder having a pocket arranged to receive the film which is retained by an overhanging flap, in this form the film is held with its greatest length disposed horizontally and its entire width wholly above or below the occlusal plane as may be desired; Fig. 7 is a central vertical longitudinal sectional view taken through the model shown in Fig. 1 depicting a film and film-holder engaged between the upper and lower central incisors which are shown in elevation as well as the film for convenience of illustration; Fig. 8 is a perspective view of a film and its holder mounted on a handle having an adjustable direction indicator pivoted to be swung into an inoperative position; Fig. 9 is a plan view of the handle illustrated in Fig. 8, showing the direction indicator swung into the recess provided in said handle but showing the operative position of said indicator in dot-and-dash lines; Fig. 10 is a front elevational view of the handle shown in Fig. 9; Fig 11 is an elevational view of the forward end of the handle shown in Figs. 9 and 10; Fig. 12 is a perspective view of a modification of the film-holder illustrated in Fig. 3; Fig. 13 is a perspective view of a modification of the film-holder illustrated in Fig. 6; Fig. 14 is a perspective view showing the mode of assembly of the film-holders shown in Figs. 12 and 13, with the perforated strip section of specially prepared adhesive tape with which it is to be secured to the film; Fig. 15 is an enlarged transverse vertical sectional view taken through the film-holder of the type shown in Fig. 12, and the adhesive tape by which it is secured to the film which is shown in side elevation for convenience of illustration; Fig. 16 is an enlarged transverse vertical sectional view taken through the film-holder of the type shown in Fig. 13 and the adhesive tape by which it is secured to the film which is shown in end elevation for convenience of illustration; Fig. 17 is a perspective view of the assembled structure ready for use including the film-holder shown in Figs. 13 and 16 and the adhesive tape partially applied to secure them together; and Fig. 18 is a perspective view of a roll of the specially prepared adhesive tape showing a portion extended therefrom and in position to be severed into sections.

In said figures, the application of my improved dental X-ray film-holder may be best understood from an inspection of Figs. 1 and 2, wherein the upper and lower denture models 1 and 2 respectively carry the antagonized incisal teeth 3 and 4 and the molar teeth 5 and 6 of the upper and lower dental arches, the same being a replica of the human dental arches, the teeth thereof normally meeting on the plane of occlusion 7.

As shown in said Figures 1 and 2, the molar teeth are shown impinging upon a film-holder of the type shown in perspective in Figs. 3 and 4, holding the film 10. Said film-holder may be formed of sheet material, such as celluloid, and comprises a strip bent or folded intermediate of its ends to form the triangular tube 11 having its upper and lower relatively inclined inwardly approaching walls 12 and 13 respectively merging into relatively parallel tooth engaging webs 15 and 16 terminating in flaps 17 and 18 extending in a connon plane, and respectively having their replicate ends 19 and 20 extended to overlap the end margins of the film 10, as shown in Figs. 2 and 3.

It will be obvious, particularly by inspection of Fig. 2, that the cusps of the teeth 5 and 6 when caused to approach the occlusal plane 7, will so slide upon the relatively inclined walls 12 and 13 as to draw the film 10, held by the flaps 17 and 18, into close contact with the lingual surfaces of said teeth 5 and 6 and the adjacent tissues so that the shadow cast by the image which it is desired to record on the film shall be sharp and clear, and of minimum distortion.

It has been extremely difficult for radiographers to determine with any degree of certainty the exact plane that the film occupies in the patient's mouth, so that the positioning of the central axis of the ray has been with more or less guesswork, and, as a consequence, many failures have been the result.

In order that the position of the film 10 may be determined with precision, the film-holder is provided with a ray directing device comprising the triangular bar 22 snugly fitted in the triangular tube 11 of the film-holder, as shown in Figs. 1 to 3 inclusive, and having the preferably cylindrical stem 23 extending outwardly therefrom in a direction normal to the plane of the film 10, and not only serving as a guide for determining the position of the X-ray tube, but tending to hold the corner of the patient's mouth back for the convenient observation by the operator.

In the form of film-holder illustrated in Fig. 5, the major portion of the film is arranged to be disposed either above or below the occlusal plane 7, and comprises the triangular tube 25 having its upper and lower relatively inclined inwardly approaching walls 26 and 27 respectively merging into relatively parallel tooth engaging webs 29 and 30 terminating in flaps 31 and 32 of relatively different length extending in a common plane and respectively having their replicate ends extended to overlap the end margins of the film 10 in the same manner as the replicate ends indicated in Figs. 2 and 4.

The form of film-holder illustrated in Fig. 6 is adapted to hold the film with its major dimension extended horizontally, to position said film with respect to either the teeth of the lower or upper dental arch separately, and comprises the triangular tube 35 having its upper and lower relatively inclined walls 36 and 37 respectively merging into relatively parallel tooth engaging webs 39 and 40 terminating in flaps 41 and 42 turned normal thereto in the same direction, to wit, downwardly, as shown in Fig. 6, in relatively spaced parallel planes arranged to be disposed upon opposite sides of an X-ray film such as the film 10 shown in Fig. 3 turned lengthwise with respect to the horizon. The flap 42 is formed at its extremity into the pocket 45 in which said film may be supported, being retained therein by the flap 41.

As illustrated in Figs. 8, 9, 10 and 11, the film 10 and its holder may be conveniently mounted on the film placing and adjusting handle 50 which has its forward end portion 51 formed triangular so as to fit into the triangular tube 11 of the film-holder shown in Fig. 8, to replace or be substituted for, the triangular bar 22.

Said handle 50 is provided with the longitudinal recess 52 in which the ray aligning pointer or direction indicator 53 is pivoted on the pintle 55 so that it may be swung into the operative position shown in Fig. 8 when the handle is being utilized to insert the film and its holder into position in the patient's mouth and the X-ray tube is being positioned as indicated by the pointer 53, after which said pointer 53 may be swung on its pintle 55 into its inoperative and out of the way position in the recess 52, as shown in Figs. 9 and 10.

The handle 50 is provided at its forward end substantially coextensive with the triangular forward end portion with the slit 56, which is incorporated therein to establish a positive or firm grip upon the film-holder, thereby enabling the operator, nurse or patient to direct pressure through the handle to a definite place in the mouth where it sometimes appears necessary to resist the force of the tongue tending to dislodge the film when the operator is attempting correct placement of the film for the lower jaw or the curve of the palate of the upper jaw.

The film-holder can, if desired, be slid in the slit 56, or said slit can be ignored and the triangular forward end slipped into the triangular tube of the film-holder, and remain thus engaged during the sensitizing of the film, or said handle may be withdrawn after properly adjusting the film-holder with the parallel webs 15 and 16 in position between the occlusal surfaces of the teeth.

A simplified construction and method of application is illustrated in Figs. 12 to 18 inclusive, and comprises film-holders adapted to be engaged with films of different sizes, forms and positions with equal facility.

The film-holder illustrated in Fig. 12 is formed of a strip of celluloid, or other suitable material, bent or folded intermediate of its ends to form the triangular tube 61 having its upper and lower inclined inwardly approaching walls 62 and 63 respectively merging into relatively parallel tooth engaging webs 65 and 66 terminating in flaps 67 and 68 extending oppositely in a common plane.

As shown in Fig. 14, the flaps 67 and 68 may be straightened out into a common plane with the webs 65 and 66 so as to be readily passed through the elongated transverse aperture 69 in the section 70 of adhesive tape 71, and then again turned oppositely into substantially parallel relation with the adhesive coated rear surface of the section shown in said figure.

The film-holder and adhesive tape section thus assembled may be attached to a dental X-ray film 72, as indicated in Fig. 15, by wrapping the adhesive tape section 70 about the film 72 with its opposite end margins 73 and 74 overlapping, as shown.

The film-holder illustrated in Fig. 13 is formed of a strip of suitable material bent or folded intermediate of its ends to form the triangular tube 75 having its converging walls 76 and 77 merging into relatively parallel tooth engaging webs 78 and 79 terminating in flaps 80 and 81 depending in relatively spaced parallel relation normal to said webs 78 and 79, and arranged to straddle the film 90, (see Fig. 16).

Similarly, this form of film-holder may have its flaps 80 and 81 straightened out into a common plane with the webs 78 and 79 and passed through an elongated transverse aperture 69 in a section 70 of adhesive tape 71 in the manner depicted in Fig. 14.

When the film-holder and adhesive tape are thus assembled, said tape may be wrapped about the film 90, as indicated in Figs. 16 and 17, with its end margins 95 and 96 overlapping the edge margin 97 of the film 90, as shown, the margin 96 in Fig. 17 being shown in the act of its folding for clarity of illustration in showing the adhesive coated surface 98.

As illustrated in Fig. 18, the specially prepared adhesive tape 71 may be provided with transverse perforations 99 forming the sections 70 of predetermined length, each having a transverse aperture 69, and may for convenience be drawn from the roll 100 and taken off as desired.

It may be here noted that freedom of movement of the parallel webs of celluloid strip which are held between the occlusal surfaces of the teeth is afforded when biting the film-holder into place, thus allowing the upper molar cusps to bite over the lower molar cusps into their correct places without straining the film.

My invention is advantageous in that the film is not only automatically positioned behind the teeth to be radiographed, and firmly held in close contact with the lingual surfaces of said teeth and the contiguous tissues, but the film-holder may have associated therewith means whereby the aligning of the ray directing tube is accomplished substantially with mathematical accuracy to obtain the undistorted shadow of the image desired.

It is to be understood that the expression "adhesive tape" as employed throughout the specification and claims broadly refers to such a gummed web of sheet or strip material that will not obstruct the passage of the X-ray, but will adhere when moistened.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dental X-ray film-holder comprising a strip of sheet material formed to provide a triangular tubular prismatic bite projection having relatively inclined tooth engaging surfaces terminating in film attaching flaps.

2. A dental X-ray film-holder comprising a film holding pocket having a hollow bite piece in the form of a three sided loop, a handle having a triangular bar removably engaged in said loop and provided with a pointer projecting outwardly normal to the plane of the film in said pocket.

3. A dental X-ray film-holder comprising means for engaging a film and having a hollow bite projection formed from a blank of sheet material and affording relatively inclined surfaces arranged to be engaged under pressure between the antagonized teeth of the opposing dental arches, and a handle fitted to said bite projection and provided with an adjustable pivoted pointer indicating the position of a film held by said film-holder.

4. A dental X-ray film-holder comprising a strip of sheet material formed intermediate of its ends to provide relatively inclined tooth engaging surfaces terminating in film attaching flaps, secured to the film by adhesive coated material.

5. A dental X-ray film-holder comprising a strip of sheet material formed to provide relatively inclined tooth engaging surfaces terminating in film attaching flaps, and a section of adhesive tape having a transverse aperture through which said flaps may be extended to be engaged with said film.

6. A dental X-ray film-holder formed of a strip of sheet material having a fold intermediate of its ends to form a tubular prismatic bite projection, and having regions adjacent its opposite ends bent to form film engaging means.

7. A dental X-ray film-holder formed of a strip of sheet material having a fold intermediate of its ends to form a tubular prismatic bite projection, and extended therefrom to provide a film-holding body.

8. A dental X-ray film-holder comprising a strip of sheet material having transverse bends affording a folded region arranged to provide a bite piece having permanently disposed relatively inclined inwardly converging surfaces extended and terminating in film supporting hooks.

9. A dental X-ray film-holder comprising a strip of stiff sheet material having a transverse fold intermediate its ends arranged to provide a substantially triangular bite projection affording permanently disposed relatively inclined tooth engaging surfaces converging inwardly and respectively approaching a plane disposed normal to the plane of a film held by said film-holder and extended to afford means by which a film may be engaged in a definite predetermined relation to said bite projection.

10. A dental X-ray film-holder comprising a bite piece of hollow triangular prismatic form having its upper and lower relatively inclined surfaces arranged to be engaged by the antagonizing cusps of the teeth of the patient, and a handle having a laterally adjustable projection extending exterior to said teeth in a position normal to the plane of said film serving to indicate the position of the film, said handle being engaged with said hollow triangular bite piece.

11. A dental X-ray film-holder comprising a blank of sheet material having folds to support a film and having a loop affording relatively inclined surfaces with which the teeth of the patient may engage to draw the film into close approach with their lingual surfaces, a handle fitted in said loop whereby said film-holder may be positioned in the patient's mouth, and a pivoted pointer indicating the position of said film and arranged to be swung into an inoperative position.

12. In combination a dental X-ray film-holder formed of a blank of sheet material having bends forming a fold to provide a triangular prismatic bite projection arranged to be engaged between opposed upper and lower teeth of the dental arches and terminating in film engaging extensions to which a film pack may be engaged, and a strip of adhesive material wrapped about said film and extensions to secure them together.

13. A dental X-ray film-holder comprising a bite projection formed of a web of stiff strip material and having folds therein forming plane regions permanently disposed in relatively inclined relation and converging toward the film held by said film-holder.

14. A dental X-ray film-holder comprising a bite projection formed of a strip of stiff sheet material and having folds therein forming plane regions permanently disposed in relatively inclined relation and converging toward the film held by said holder, and terminating in means for supporting said film.

15. A dental film-holder comprising a bite piece having outwardly connected relatively inclined surfaces approaching inwardly and arranged to be engaged by the antagonizing cusps of the upper and lower teeth of the dental arches and a carrier therefor having means projecting outwardly normal to the plane of the held film, serving as a guide when in operative position indicating the position of said film and adjustable laterally with respect thereto into an inoperative position.

WILLIAM EVERETT WILSON.